A. TSCHOP.
Horse Hay-Rake.
No. 199,239. Patented Jan. 15, 1878.
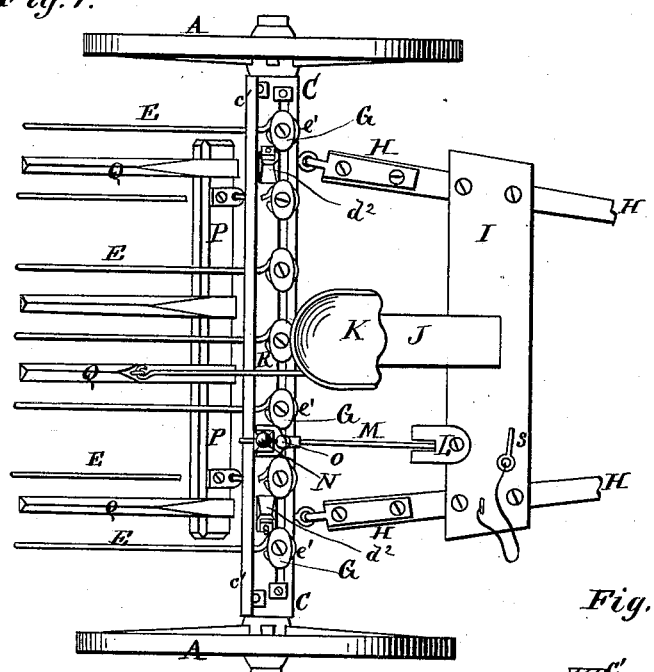
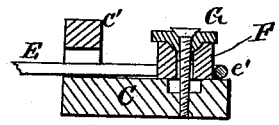
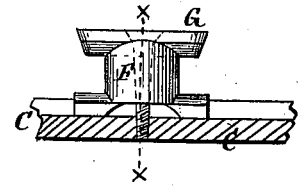
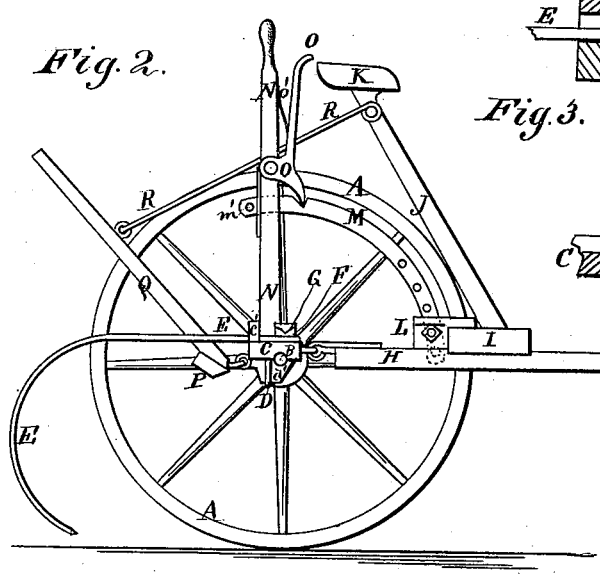
WITNESSES:
Henry N. Miller
J. H. Scarborough
INVENTOR:
A. Tschop
BY Munn & Co
ATTORNEYS.

UNITED STATES PATENT OFFICE.

ALBERT TSCHOP, OF HARRISBURG, PENNSYLVANIA.

IMPROVEMENT IN HORSE HAY-RAKES.

Specification forming part of Letters Patent No. 199,239, dated January 15, 1878; application filed November 8, 1877.

*To all whom it may concern:*

Be it known that I, ALBERT TSCHOP, of Harrisburg, in the county of Dauphin and State of Pennsylvania, have invented a new and useful Improvement in Horse Hay-Rakes, of which the following is a specification:

Figure 1 is a top view of my improved rake. Fig. 2 is a side view of the same. Fig. 3 is a detail front view of one of the devices for holding the rake-teeth. Fig. 4 is a detail section of the same, taken through the line $x\,x$, Fig. 3. Fig. 5 is a detail view of the axle.

Similar letters of reference indicate corresponding parts.

The object of this invention is to furnish an improved horse hay-rake which shall be simple in construction, light, strong, and durable, easily and conveniently operated, and which may be manufactured at less expense than ordinary hay-rakes.

The invention will first be described in connection with the drawing, and then pointed out in the claims.

A are the wheels, which revolve upon the axle-arms B attached to the axle C. The axle-arms B are inserted in half-round grooves formed in the under side of the end parts of the axle C, where they are secured in place by the U-bolts $b^1$, which pass around them, pass through the axle C, and have nuts screwed upon their ends. The axle-arms B are further secured in place by the bolts $b^2$, that pass through their inner ends and through the said axle C. The axle C is strengthened by the truss-rod D, the arch of which is supported by a block, $d^1$, and its end parts pass through inclined holes in the end parts of the said axle through the washers $d^2$, and have nuts screwed upon its ends to enable its tension to be adjusted as required. The washers $d^2$ are beveled upon the inner side to cause them to fit firmly against the said axle. By this construction the axle C will be held securely against sagging, and may be made lighter than would otherwise be possible while having the requisite strength.

E are the rake-teeth, the lower parts of which are curved to give them the proper form for collecting the hay or other substance to be raked. Upon the upper ends of the rake-teeth E are formed eyes $e'$, at right angles with their curves, which eyes are passed over studs F. The studs F are placed upon the upper side of the axle C, have cross-heads formed upon their lower ends to enter a longitudinal groove in the said axle C, and prevent them from turning, and have plates G, provided with cross-ribs upon the lower side, placed upon their upper ends.

The plates G and studs F are secured to each other and to the axle C by bolts passing through them and through the said axle.

By this construction the rake-teeth will be held securely, and at the same time allowed to have a vertical play to accommodate themselves to the surface of the ground. The rake-teeth E are held against lateral movement, and their vertical play is limited by the bar $c'$ attached to the rear part of the upper side of the axle C, and which has notches or short slots formed in its lower side to receive the said teeth.

H are the thills, the rear ends of which are hinged to the forward edge of the axle C, and which are connected at a little distance from said rear ends by a cross-bar, I. To the center of the cross-bar I is attached the lower end of the inclined standard J, to the upper end of which is attached the driver's seat K. To the cross-bar I, at a little distance from the standard J, is bolted a block, L, the rear part of which projects, and is slotted to receive the lower part of the curved bar M. Several holes are formed in the curved bar M, to receive the bolt, by which it is secured to the block L, to enable the said curved bar M to be adjusted to regulate the distance from the ground at which the points of the teeth E work. The curved bar M passes through a slot in the lever N, the lower end of which is rigidly attached to the upper side of the axle C.

To the lever N is pivoted a lever-pawl, O, in such a position that the engaging end of said pawl may rest upon the upper or convex edge of the curved bar M, and may enter a notch in the upper part of said curved bar M at such a point as to lock the rake-teeth E in working position. To the upper end of the curved bar M is attached a stop pin or block, $m'$, to prevent the lever N from slipping off the said bar M.

The engaging end of the lever-pawl O is held against the curved bar M by a spring, $o'$, interposed between said lever-pawl and the lever N.

To the rear side of the axle C is hinged a bar, P, to which are attached the ends of a number of fingers, Q. The fingers Q project between the rake-teeth E, so that when the said teeth are raised to discharge the collected hay the said fingers may push the hay from the said teeth and clean them. To one of the fingers Q is pivoted the end of a rod, R, the other end of which is pivoted to the upper part of the seat-standard J.

With this construction, when the lever N is moved forward to raise the rake-teeth E, to discharge the collected hay, the turning of the axle C lowers the rear ends of the thills H and raises the cross-bar P of the fingers Q, which movement, in connection with the rod R, causes the said fingers Q to move downward as the rake-teeth E move upward, so as to push the hay off said teeth and cause it to drop as a windrow.

The teeth E may be locked in a raised position, for convenience in passing from place to place, by passing a pin, S, through a hole in the curved bar M above the lever N.

Having thus described my invention, I claim as new and desire to secure by Letters Patent—

1. The construction of an axle on a hay-rake with truss-rod D, block $d^1$, and nuts and washers $d^2$, or its equivalent for tightening rod, substantially as herein shown and described.

2. The combination of the slotted block L, the adjustable curved catch and stop-bar M, the lever N, and the spring lever-pawl O $o'$ with the axle C and the cross-bar I of the thills H of a hay-rake, substantially as herein shown and described.

3. The combination of the studs F, having cross-heads formed upon their lower ends, and the plates G, having cross-ribs formed upon their lower sides, with the eyes $e'$ formed upon the upper ends of the rake-teeth E, and with the grooved axles C, substantially as herein shown and described.

ALBERT TSCHOP.

Witnesses:
 DAVID W. RUNK,
 J. C. FISLER.